United States Patent
Glavicic et al.

(10) Patent No.: US 11,392,898 B2
(45) Date of Patent: Jul. 19, 2022

(54) SECURE CLOUD COLLABORATION PLATFORM

(71) Applicant: Rolls-Royce Corporation, Indianapolis, IN (US)

(72) Inventors: Michael Glavicic, Avon, IN (US); Maxwell Layman, Indianapolis, IN (US); John Frederick Matlik, Danville, IN (US); Todd Wetherbee, Fishers, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 752 days.

(21) Appl. No.: 16/268,690

(22) Filed: Feb. 6, 2019

(65) Prior Publication Data

US 2020/0250621 A1    Aug. 6, 2020

(51) Int. Cl.
| | |
|---|---|
| *G06Q 10/10* | (2012.01) |
| *H04L 9/30* | (2006.01) |
| *H04L 9/32* | (2006.01) |
| *G06F 21/62* | (2013.01) |
| *G06Q 50/18* | (2012.01) |

(52) U.S. Cl.
CPC ........... *G06Q 10/103* (2013.01); *G06F 21/62* (2013.01); *G06F 21/6209* (2013.01); *G06Q 10/101* (2013.01); *H04L 9/30* (2013.01); *H04L 9/3263* (2013.01); *G06Q 50/184* (2013.01)

(58) Field of Classification Search
CPC .......................... G06Q 10/103; G06Q 10/101; G06F 21/6209; H04L 9/30; H04L 9/3263
See application file for complete search history.

(56) References Cited

U.S. PATENT DOCUMENTS

| | | | |
|---|---|---|---|
| 6,952,682 B1 | 10/2005 | Wellman | |
| 8,112,320 B2 | 2/2012 | D'Ambrosio et al. | |
| 8,965,793 B2 | 2/2015 | Kersten et al. | |
| 2004/0093397 A1* | 5/2004 | Chiroglazov | ......... G06F 21/125 709/219 |

(Continued)

FOREIGN PATENT DOCUMENTS

WO     WO 01/69506 A2     9/2001

OTHER PUBLICATIONS

"Solving the Design Cost Conundrum," dated Jan. 23, 2019, pp. 1-10, Aerospace Manufacturing Magazine, published by MIT Publishing, Rochester, UK.

(Continued)

*Primary Examiner* — Jung W Kim
*Assistant Examiner* — Alan Lingqian Kong
(74) *Attorney, Agent, or Firm* — Crowell & Moring LLP

(57) ABSTRACT

Systems and methods for secure collaboration of intellectual property are provided. By way of introductory example, a cloud environment may store a session descriptor indicative of an executable, an input parameter for the executable, and a target recipient. The cloud environment may receive a first and second authorization of the session descriptor from the respective proprietors of the input parameter and the executable. The cloud environment may verify, based on the first authorization and the second authorization, the session descriptor is authorized. The cloud environment may generate, in response to the session descriptor being authorized, a collaboration result based on the executable and the input parameter. The cloud environment may control access to the collaboration result based on the target recipient.

19 Claims, 5 Drawing Sheets

(56) References Cited

U.S. PATENT DOCUMENTS

| | | | | |
|---|---|---|---|---|
| 2004/0221179 A1* | 11/2004 | Seshadri | ............. | H04L 63/0272 717/103 |
| 2006/0085322 A1 | 4/2006 | Crookshanks | | |
| 2006/0212714 A1* | 9/2006 | Ting | ................... | H04L 63/0281 713/182 |
| 2012/0284410 A1 | 11/2012 | Dudek et al. | | |
| 2013/0014023 A1* | 1/2013 | Lee | ...................... | G06Q 10/101 715/751 |
| 2013/0311894 A1* | 11/2013 | Rexer | ................... | G06F 21/629 715/741 |
| 2014/0157579 A1 | 6/2014 | Chhabra et al. | | |
| 2015/0163206 A1* | 6/2015 | McCarthy | ............... | H04L 63/06 713/171 |
| 2018/0060456 A1* | 3/2018 | Phatak | .................. | G06F 9/5027 |
| 2018/0062852 A1* | 3/2018 | Schmahmann | ...... | G06Q 10/101 |
| 2019/0108419 A1* | 4/2019 | Coven | .................. | G06K 9/6289 |

OTHER PUBLICATIONS

"DEXcenter," dated 2019, pp. 1-2, published online by International TechneGroup Incorporated at URL https://www.iti-global.com/dexcenter.

"What is Azure IoT Hub?," dated Jul. 30, 2018, pp. 1-3, published online by Microsoft Azure at URL https://docs.microsoft.com/en-us/azure/iot-hub/about-iot-hub.

"A Workflow Designed for Engineers and Scientists," Rescale—Features, dated 2019, pp. 1-6, published online by Rescale, Inc. at URL https://www.rescale.com/features/workflow/.

* cited by examiner

SECURE CLOUD COLLABORATION PLATFORM

TECHNICAL FIELD

This disclosure relates to cloud computing and, in particular, to secure collaboration with cloud computing.

BACKGROUND

Proprietors of intellectual property may collaborate to evaluate the feasibility of joint enterprise. Collaboration traditionally involves revealing the intellectual property to each proprietor to determine the feasibility of the joint enterprise. By revealing the intellectual property, the proprietors risk losing control of sensitive information that may represent a significant investment. Legal agreements to govern access to the intellectual property may be inefficient, costly, and/or over restrictive. Moreover, legal agreements may be breached, resulting in misappropriation of the intellectual property.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Systems and methods for secure collaboration of intellectual property are provided. By way of introductory example, a cloud environment may store a session descriptor. The session descriptor may indicative of an executable, an input parameter for the executable, and a target recipient. The cloud environment may control access to the executable and the input parameter. A first accountholder may be permitted to access the executable and not the input parameter. A second accountholder may be permitted to access the input parameter and not the executable.

The cloud environment may receive a first and second authorization of the session descriptor. The first authorization may correspond to the first accountholder and the second authorization corresponding to the second accountholder. The cloud environment may verify, based on the first authorization and the second authorization, the session descriptor is authorized. The cloud environment may generate, in response to the session descriptor being authorized, a collaboration result based on the executable and the input parameter. The cloud environment may control access to the collaboration result based on the session descriptor. For example, the target recipient identified in the session descriptor may be permitted to access the collaboration result.

One technical advancement of the systems and methods described below may be that proprietors of intellectual property may temporarily permit a collaboration session without proprietor gaining access to either the other proprietor's data or algorithms. For example, an executable from a first proprietor and input data from a second proprietor may be communicated to the cloud system. The executable and the input data may be encrypted until the proprietors provide decryption information. The executable may perform various operations that access the input data. The executable may generate a result that is shared with a pre-approved recipient. Access to the input data and executable may be controlled so that input data and executable are not shared between the proprietors. The input data and the executable may be removed from the cloud environment after the result is generated.

Alternatively, or in addition, a technical advancement of the systems and methods described below may be that proprietors may establish consensus regarding the rules for a collaboration. A session descriptor may specify the rules and parameters of the collaboration. Once each of the proprietors authorize the session descriptor, the collaboration session may be performed. The session descriptor may control how the collaboration takes place, the intellectual property involved in the collaboration, and/or the recipients authorized to receive results of the collaboration. Additional or alternative technical advancements are made evident by the systems and methods described herein.

Figure 1:
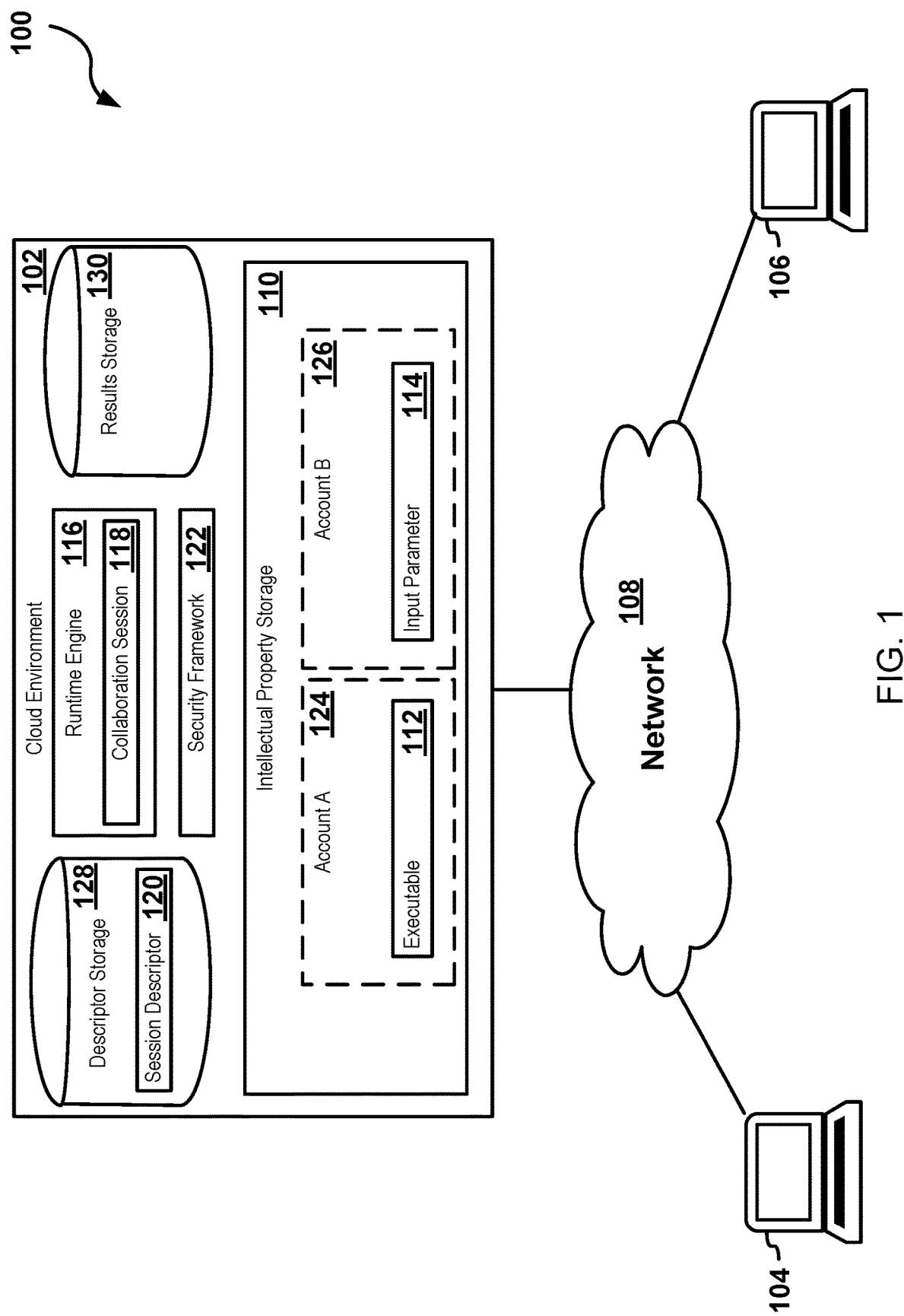
FIG. 1 illustrates a first example of a system.

FIG. 1 illustrates a first example of a system 100. The system may include a cloud environment 102. The cloud environment 102 may include one or more server that communicates with remote devices 104, 106 via a communications network 108. In some examples, the identities of individuals accessing the remote devices 104,106 may be authenticated by the cloud environment 102 according to a credential-based authentication scheme.

The cloud environment 102 may include an intellectual property (IP) storage 110. The intellectual property (IP) storage 110 may include a database, memory locations, tables, and/or data structures that store intellectual property data communicated to the cloud environment 102. The intellectual property data 112, 114 may include information submitted to the cloud environment 102 by, for example, proprietors that wish to evaluate the feasibility of a joint effort based on the intellectual property data without revealing the intellectual property data to each other. For example, the intellectual property data 112, 114 may include, among other types of data, an executable 112 (or multiple executables) and an input parameter 114 (or input parameters).

The executable 112 may be any code that executable on a computing device. The executable 122 may include logic that was created by a first proprietor to evaluate input data and generate output data based on the input data. For example, the executable 112 may include (or access) models, algorithms, instructions, and logic. In some examples, the executable 112 may include an executable file or a binary compiled from computer code. In other examples, the executable 112 may include a set of instructions that are compiled and executed with just-in-time compilation, dynamic-complication, runtime compilation, or other runtime techniques. Alternatively or in addition, the executable 112 may include a script, such as batch, JavaScript, or some other set of instructions that are executed without compilation.

The input parameter 114 may include any data to which a proprietor of the data controls access. For example, the input parameter 114 may include specifications, technical parameters, prices, or other proprietary information that may be evaluated by the executable 112. In some examples, the input parameter 114 may include a file or a portion of a file. In other examples, the input parameter 114 may include information stored in a table or some other data structure.

The executable 112, when executed, may analyze the input data 112 and generate a result based on the input data 112. Depending on the implementation, the executable 112 may include logic that performs a reverse auction while the input data may include price information. In another example, the executable 112 may include a simulation of a component, where the input parameters describe operational attributes for sub-components of the component. In general, the executable may include logic that evaluates input parameter(s) to determine a result based on the input parameter(s).

The system 100 may include a runtime engine 116. The runtime engine 116 may include a runtime environment that administers the execution of instructions with computer resources. The runtime engine 116 may perform analysis, execution, and/or evaluation of the intellectual property data 112, 114. For example, the runtime engine 116 may access the executable 112 and execute the executable 112 with the input parameter 114 to generate the collaboration result.

In some examples, the executable 112 may adhere to a predetermined interface for receiving input data. For example, the executable 112 may receive the input parameter 114 via a command line interface. In other examples, the executable 112 may read from a file that is pre-populated with the input parameter 114. Alternatively or in addition, the executable may receive the input parameter 114 via a message broker or some other communication channel.

The runtime engine 116 may create a collaboration session 118 or multiple collaboration sessions. The collaboration session 118 may include a temporarily permitted interaction between separate sets of intellectual property. For example, the collaboration session 118 may allocate computing resources to access the executable 112 and the input parameter 114 and generate a collaboration result by execution of the executable 112 with the input parameter 114. In some examples, the collaboration session 118 may include a task (or multiple tasks), such as process, a thread, or other allocations of processing time, that perform operations included in the executable 112. Alternatively or in addition, the collaboration session 118 may include various states that indicate the status of the collaboration session 118. For example, the states may include "created", "started", "pending", "stopped", "retired", "error", and/or any other suitable state.

The runtime engine 116 may create the collaboration session 118 based on a session descriptor 120. The session descriptor 120 may include predetermined parameters and/or rules for the collaboration session 118. In some examples, the session descriptor may include a file. Alternatively or in addition, the session descriptor may include a set of information that follows a predetermined format, such as Extensible Markup Language (XML), comma-separated formatting, or any other data encoding. Alternatively or in addition, the session descriptor may include a Table 1 includes an example of the session descriptor 120.

TABLE 1

| Session Descriptor | |
| --- | --- |
| Descriptor Identifier | A unique identifier for the descriptor. |
| Target Recipient Identifier | An identifier of a recipient permitted to receive the collaboration result of a collaboration session. Alternatively or in addition, the target recipient identifier may include an address, such as an email address, username, or some other address. |
| Collaboration Rule | Identifiers of the input parameter(s) and/or executables(s) permitted to be accessed during a collaboration session. In some examples, the collaboration rule may identify multiple executables and/or input parameters associated with different respective accounts. Alternatively or in addition, the collaborations rule may map the outputs of some executables to the inputs of other executables. |
| Proprietors | Identifiers or credentials of the proprietors that have a proprietary interest in intellectual property data. In some examples, the identifiers may include identifiers of account holders and/or accounts. |
| Public Keys | Public keys that are cryptologically paired with private keys for digital signatures that authorize the session descriptor. The public keys may be associated with the proprietors. A digital signature signed with private key by a device of the proprietor may be verified with a corresponding public key associated with the proprietor. |

In some examples, the system 100 may include a security framework 122. The security framework 122 may control access to intellectual property data 112, 114. For example, the security framework 122 may control access to the executable 112 and the input parameter 114 based on the accounts 124, 126 respectively associated with the executable 112 and the input parameter 114.

An accountholder may refer to a proprietor (i.e. a person or organization) that is are authorized to access certain information on the cloud environment 102. The accountholder may be associated with an account or set of accounts. The security framework 122 may restrict the accountholder from accessing certain intellectual property information and permit the accountholder to access other intellectual property information. By way of example, the executable 112 may be associated with a first account 124 and the input parameter 114 may be associated with a second account 126. The security framework 122 may permit an accountholder of the first account 124 to access the executable 112 and restrict the account holder of the first account 124 from accessing the input parameter 114. Alternatively or in addition, the security framework 122 may permit the accountholder of the second account 126 to access the input parameter 114 and restrict the accountholder of the second account 126 from accessing the executable 112.

The system may include a descriptor storage 128. The descriptor storage 128 may store session descriptors. In some examples, the descriptor storage 128 may retrieve one or more session descriptors based on query parameters, such as the descriptor identifier, the session identifier, or other search parameters. In some examples, the descriptor storage 128 may store one or more authorization corresponding to the session descriptor 120.

An authorization of the session descriptor 120 may include a permission that permits the runtime engine 116 to perform the collaboration session 118 based a corresponding session descriptor. In some examples, the authorization may include an encryption key. The runtime engine 116 may decrypt, based on the encryption key, encrypted information stored in the IP storage 110. For example, the executable 112 may be encrypted based on a first encryption key and the input parameter 114 may be encrypted based on a second encryption key. They runtime engine 116 may access the first encryption key and the second encryption key to separately decrypt the executable 112 and the input parameter 114.

Alternatively or in addition, the authorization of the session descriptor 120 may include a certification of the session descriptor 120. The certification may include a digital signature generated based on a public key and private key pair. In some examples, the digital signature may include an encryption, such as a hash encryption, of the session descriptor 120 with a private key. The signed session descriptor 120 may represent a certification of the session descriptor 120 by a particular proprietor. The cloud environment 102 may verify the integrity of the session descriptor 120 and/or the identity of the signor of the session descriptor 120 based in the public key.

As noted in Table 1 above, the session descriptor 120 may identify the proprietors and/or the public keys of the proprietors. The proprietors may include individuals or organizations that have an interest in controlling access to intellectual property. For example, a first proprietor may have a proprietary interest in the executable 112 and a second proprietor may have a proprietary interest in the input parameter 114. In some examples, the proprietors identified in the session descriptor 120 may include required signatories of the session descriptor 120. The runtime engine 116 may generate or start the collaboration session 118 in response to determination that session descriptor 120 has been signed by all stakeholders identified by the session descriptor 120.

The system may further include a results storage 130. The results storage 130 may include a database, memory locations, tables, and/or data structures that store collaboration results. The collaboration result may include the output(s) of one or more executables executed during the collaboration session 118. For example, the collaboration result may include output information generated by execution of the executable 112 with the input parameter 114 during the collaboration session 118. The collaborations result may be associated with the unique identifier of the session descriptor 120, the collaboration session 118, and/or information included in the session descriptor 120, such as the target recipient permitted to access the collaborations result. The security framework 122 may control access to collaboration results based on the target recipient(s) identified in the session descriptor 120.

Figure 2:
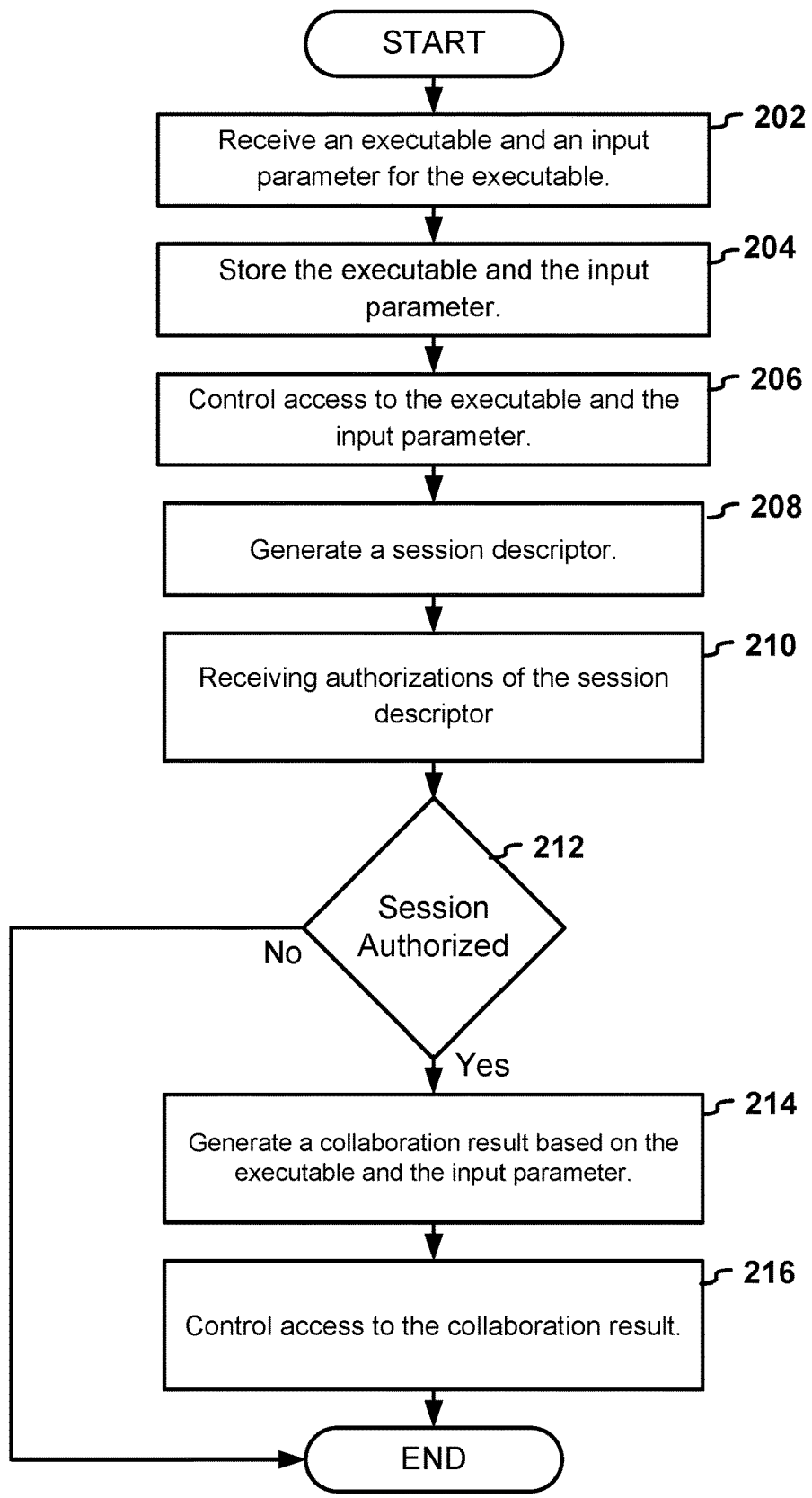
FIG. 2 illustrates a flow diagram of example logic for a system.

FIG. 2 illustrates a flow diagram of example logic for the system 100. The cloud environment 102 may receive the executable 112 and the input parameter 114 (202). For example, the cloud environment 102 may receive the executable 112 from the first device 104. The first device 104 may be authenticated under the first account 124. The cloud environment 102 may receive the input parameter 114 from the second device 106. The second device 106 may be authenticated under the second account 126. In other examples, the cloud environment 102 may receive multiple input parameters and/or executables from various remote devices. Each of the various remote devices may be authenticated under separate corresponding accounts.

The cloud environment 102 may store the executable 112 and the input parameter 114 (204). In some examples, the cloud environment 102 may associate the executable 112 with the first account 124 and the input parameter 114 with the second account 126. Alternatively or in addition, the cloud environment 102 may store multiple executables and input parameters associated with various corresponding accounts.

The cloud environment 102 may control access to the executable 112 and/or input parameter 114 (206). For example, the executable 112 may be associated with a first accountholder for the first account 124. The input parameter 114 may be associated with a second accountholder for the second account 126. The cloud environment 102 may restrict the second accountholder from accessing the executable 114, and may restrict the first accountholder from accessing the input parameter 114.

The cloud environment 102 may generate a session descriptor 120 (208). In some examples, the cloud environment 102 may receive a request to generate the session descriptor 120. For example, the cloud environment 102 may generate a graphical user interface with controls and fields that receive inputs corresponding to various fields of the session descriptor 120, such as the fields shown in Table 1. The session descriptor 120 may be transmitted to the cloud environment 102. The cloud environment 102 may store the generated session descriptor 120 in the descriptor storage 128.

The cloud environment 102 may receive authorizations of the session descriptor 120. For example, the cloud environment 102 may receive a first authorization and a second authorization of the session descriptor 120 (210). The cloud environment 102 may determine whether the session is authorized (212).

An authorization of the session descriptor 120 may include a permission that permits the runtime engine 116 to create, start, and/or perform the collaboration session 118 based a corresponding session descriptor. In some examples, the authorization may include an encryption key. The cloud environment 102 may decrypt, based on the encryption key, encrypted information identified by the session descriptor 120. For example, the executable 112 may be encrypted based on a first encryption key and the input parameter 114 may be encrypted based on a second encryption key. The cloud environment 102 may access the first encryption key from a first authorization and the second encryption key from a second authorization. The cloud environment 102 may decrypt the executable 112 based on the first encryption key. The cloud environment 102 may decrypt the input parameter 114 based on the second encryption key.

Alternatively or in addition, the authorization of the session descriptor 120 may include a certification of the session descriptor 120. For example, the cloud environment 102 may receive a first authorization and a second authorization. The first authorization may include a first certification of the session descriptor 120 and the second authorization may include a second certification of the session descriptor 120. The first certification may include a first digital signature of the session descriptor 120 signed with a first private key. The second certification may include a second digital signature of the session descriptor 120 signed with a second private key. The first private key may be paired with a first public key and the second private key may be paired with a second public key. The cloud environment 102 may verify the first and second certifications based on the first and second public keys. For example, the cloud environment 102 may determine the particular proprietors (or devices of the proprietor) caused the certifications to be signed.

In some examples, the cloud environment 102 may transmit the session descriptor to the first device 104 and the second device 106. For example, the first device 104 may have submitted the executable 112 to the cloud environment 102 and the second device 106 may have submitted the input parameter 114 to the cloud environment 102. The cloud environment 102 may receive, from the first device 104, the first authorization of the session descriptor 120. Alternatively or in addition, the cloud environment 102 may receive, from the second device 106, the second authorization of the session descriptor 120.

In some examples, the session descriptor 120 may identify the proprietors that are required to authorize the session descriptor 120. The cloud environment 102 may determine that the session descriptor 120 is authorized in response to receiving and verifying the certifications for each of the proprietors. For example, the cloud environment 102 may determine that remote devices associated with the proprietors electronically signed (i.e. encrypted) the session descriptor 120 with private keys that are respectively paired with the public keys. The cloud environment 102 may access the pubic keys from the session descriptor 120, or some other source.

In response to the session descriptor 120 being authorized, the cloud environment 102 may generate the collaboration result based on the executable 112 and the input parameter 114 (214). For example, the cloud environment 102 may execute the executable 112 and make the input parameter 114 accessible to operations performed by the executable 112. Alternatively or in addition, the cloud environment 102 may pass the input parameter 114 to procedural calls of the executable 112. Alternatively or in addition, the cloud environment 102 may permit the executable 112 (or a task performing the executable 112) to access the input parameter 114. The executable 112 may perform simulations, analysis, profiling, and/other analysis based on the input parameter 114 and then generate the collaboration result.

The cloud environment 102 may control access to the collaboration result (216). For example, the cloud environment 102 may control access to the collaboration result based on the session descriptor 120. The session descriptor 120 may indicate a target recipient (or multiple target recipients) permitted to access and/or receive the collaboration result. The cloud environment 102 may permit the access to the collaboration result by the target recipient. For example, the session descriptor 120 may include an identifier of a particular account or account holder. The cloud environment 102 may permit access to the collaboration result by the account holder and/or account holders of the account.

The operations described in reference to FIG. 2 may include additional, different, or fewer operations than illustrated in FIG. 2. The operations may be executed in a different order than illustrated in FIG. 2.

In some examples, the cloud environment 102 may delete intellectual property data after a collaboration result is generated. For example, after the collaboration session 118 generates the collaboration result based on the executable 112 and the input parameter 114, the cloud environment 102 may delete the executable 112 and/or the input parameter 114.

Alternatively or in addition, the cloud environment 102 may temporarily decrypt the executable and the input parameter 114 to perform the collaboration session 118. For example, the cloud environment 102 may receive an encrypted executable and an encrypted input parameter 114. The cloud environment 102 may receive a first encryption key and a second encryption key. The cloud environment 102 may temporarily decrypt the encrypted executable and the encrypted input parameter 114 based on the first and second encryption keys. After the collaboration result is generated, the cloud environment 102 may re-encrypt the executable and the input parameter 114.

Figure 3:
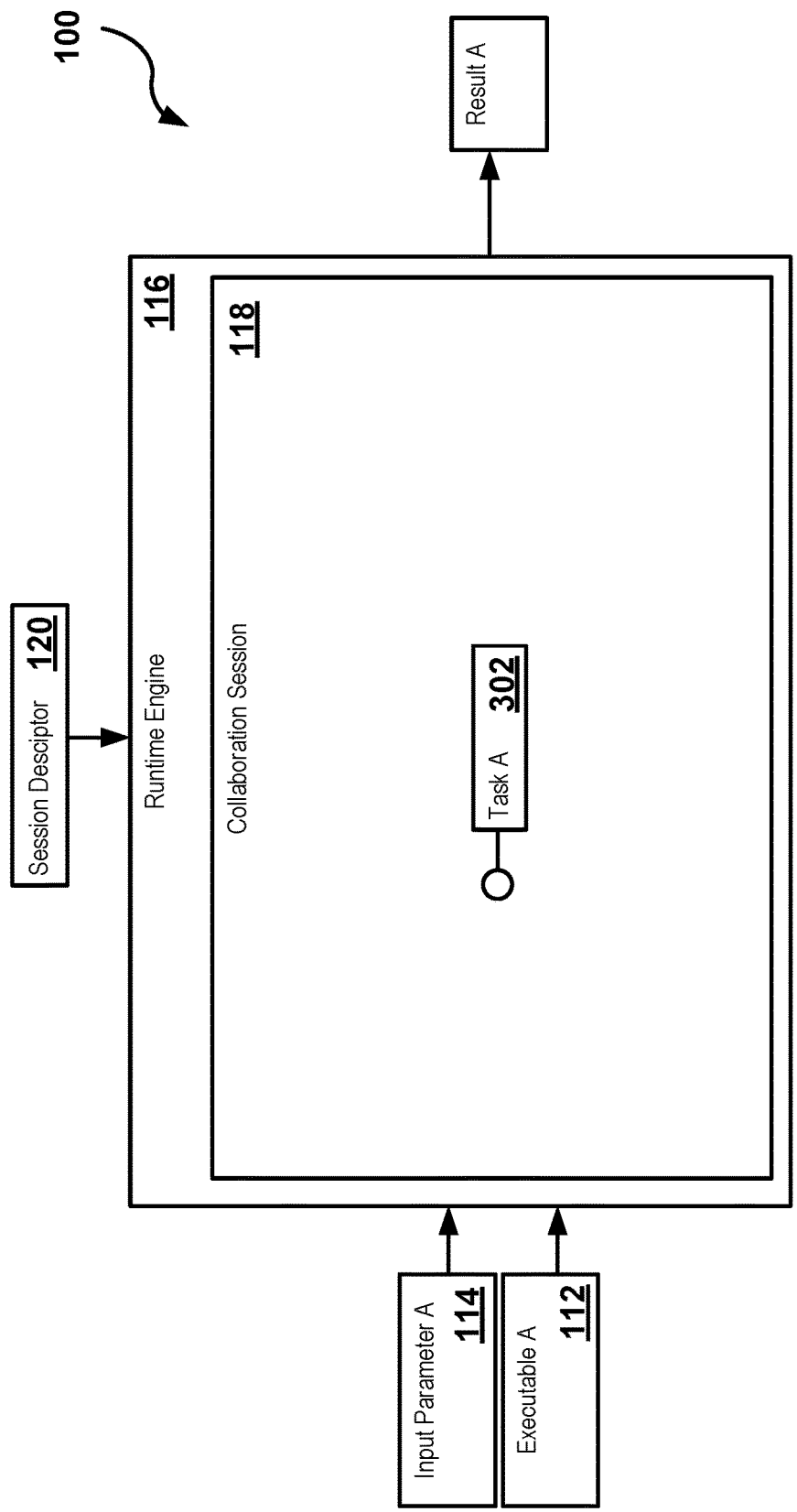
FIG. 3 illustrates a first example of a collaboration session.

FIG. 3 illustrates a first example of the collaboration session 118. The collaboration session 118 may generate a task 302 that executes the executable 112. The task 302 may include an allocation of computer resources. For example, the task may include a process, a thread, or some other allocation of processor time to performing the logic included in the executable 112. As illustrated in FIG. 3, the collaboration session 118 may allocate the task 302 (identified as Task A) for executing the executable 112 (identified as Executable A). The task 302 may access the input parameter 114 (identified as Input Parameter A). In some examples, the task 302 may access the input parameter 114 directly from the IP storage 110 (shown in FIG. 1). Alternatively or in addition, the task 302 may access the input parameter 114, or a copy, from some other memory location.

The runtime engine 116 may create, perform, destroy, and/or manage the collaboration session 118 based on the session descriptor 120. As described in Table 1 above, the session descriptor 120 may include the collaboration rule. The collaboration rule may identify one or more executables and/or input parameters. Alternatively or in addition, the collaboration rule may specify how information flows between task(s) in a collaboration session 118. Table 2 is an example of the collaboration rule for the collaboration session 118 illustrated in FIG. 3.

TABLE 2

Collaboration Rule Example One

| Input | Process | Output |
| --- | --- | --- |
| Input Parameter A | Task A | Result A |

The example of the collaboration rule in Table 2 may cause the runtime engine 116 to create and/or perform the collaboration session 118 where Task A generates Result A based on Input Parameter A. In some examples, the runtime engine 116 may decrypt Input Parameter A and/or copy Input Parameter A to a memory location accessible by the Task A.

Figure 4:
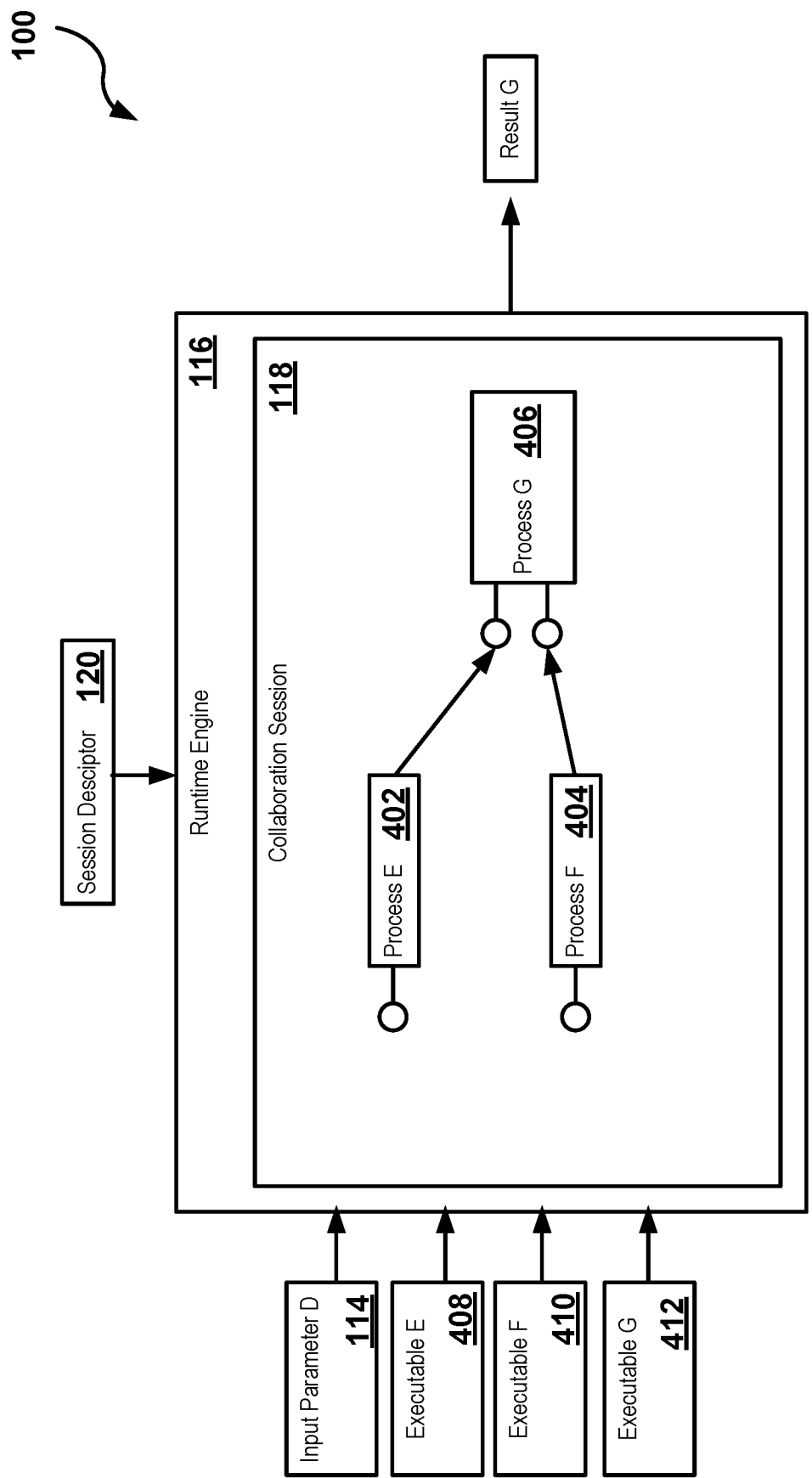
FIG. 4 illustrates a second example a collaboration session.

FIG. 4 illustrates a second example the collaboration session 118. In some examples, the collaboration rule may identify multiple executables and/or input parameters. For example, each of the executables and/or input parameters may be associated with a separate proprietor. The collaboration session 118 may generate multiple tasks for the executables, respectively. The collaboration session may map outputs from some of the tasks to inputs to other tasks. In some examples, the session descriptor 120 may specify how to map the input and outputs of multiple tasks. Table 3 includes a second example of the collaboration rule.

TABLE 3

Collaboration Rule Example Two

| Input | Executable | Output |
| --- | --- | --- |
| Input Parameter D | Executable E | Result E |
| Input Parameter D | Executable F | Result F |
| Result E, Result F | Executable G | Result G |

Based on the collaboration rule in Table 3, the collaboration session 118 may generate a first task 402 (labeled Task E), a second task 404 (labeled Task F), and a third task 406 (labeled Task G). The first task 402 may correspond to a first executable 408 (labeled Executable E). The second task may correspond to a second executable 410 (labeled Executable F). The third task 406 may correspond to third executable 412 (labeled Executable G). The collaboration rule of the session descriptor 120 may specify that the first task 402 and the second task 404 are to receive the input parameter 114 (labeled Input Parameter D). The collaboration rule may specify the third task 406 outputs the collaboration result (labeled Result G). The collaboration rule may specify that the third task 406 receives the output of the first task 402 and the second task 404.

The system 100 described herein may include additional and/or fewer components than shown in the figures. For example, the system 100 may include the cloud environment 500. The cloud environment may be included additional and/or fewer components that shown in the figures. In some examples, the cloud environment may include the runtime engine 116. The runtime engine 116 may generate one or more collaboration session.

In some examples, the collaboration session 118 (or other collaboration sessions) may execute multiple executables and access multiple input parameters. The executable(s) and input parameter(s) accessed by the collaboration session may each be associated with separate account holders or accounts. Alternatively, the cloud system may not associate the executable(s) and input parameter(s) with accounts, but instead evaluate certifications and/or encryption keys to verify authorization of a session descriptor.

Figure 5:
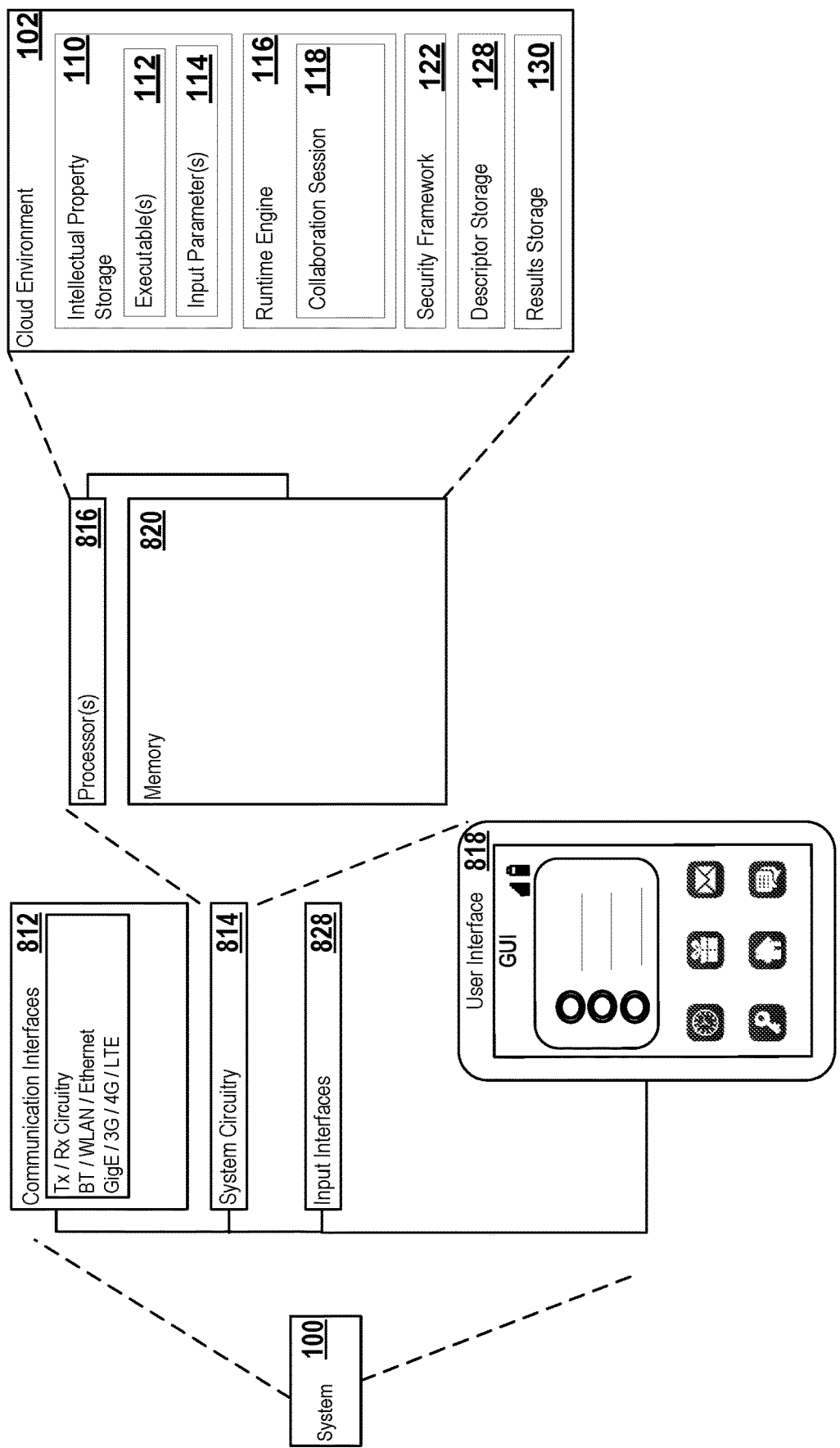
FIG. 5 illustrates a second example of a system.

FIG. 5 illustrates a second example of the system 100. The system 100 may include communication interfaces 812, input interfaces 828 and/or system circuitry 814. The system circuitry 814 may include a processor 816 or multiple processors. Alternatively or in addition, the system circuitry 814 may include memory 820.

The processor 816 may be in communication with the memory 820. In some examples, the processor 816 may also be in communication with additional elements, such as the communication interfaces 812, the input interfaces 828, and/or the user interface 818. Examples of the processor 816 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 816 may be one or more devices operable to execute logic. The logic may include computer executable instructions or computer code stored in the memory 820 or in other memory that when executed by the processor 816, cause the processor 816 to perform the operations the IP storage 110, the executable(s) 122, the input parameter(s) 114, runtime engine 116, the collaboration session 118, the security framework 122, the descriptor storage 128, the results storage 130, the cloud environment 102, and/or the system 100. The computer code may include instructions executable with the processor 816.

The memory 820 may be any device for storing and retrieving data or any combination thereof. The memory 820 may include non-volatile and/or volatile memory, such as a random access memory (RAM), a read-only memory (ROM), an erasable programmable read-only memory (EPROM), or flash memory. Alternatively or in addition, the memory 820 may include an optical, magnetic (hard-drive), solid-state drive or any other form of data storage device. The memory 820 may include at least one of the IP storage 110, the executable(s) 122, the input parameter(s) 114, runtime engine 116, the collaboration session 118, the security framework 122, the descriptor storage 128, the results storage 130, the cloud environment 102, and/or the system 100. Alternatively or in addition, the memory may include any other component or sub-component of the system 100 described herein.

The user interface 818 may include any interface for displaying graphical information. The system circuitry 814 and/or the communications interface(s) 812 may communicate signals or commands to the user interface 818 that cause the user interface to display graphical information. Alternatively or in addition, the user interface 818 may be remote to the system 100 and the system circuitry 814 and/or communication interface(s) may communicate instructions, such as HTML, to the user interface to cause the user interface to display, compile, and/or render information content. In some examples, the content displayed by the user interface 818 may be interactive or responsive to user input. For example, the user interface 818 may communicate signals, messages, and/or information back to the communications interface 812 or system circuitry 814.

The system 100 may be implemented in many different ways. In some examples, the system 100 may be implemented with one or more logical components. For example, the logical components of the system 100 may be hardware or a combination of hardware and software. The logical components may include the IP storage 110, the executable(s) 122, the input parameter(s) 114, runtime engine 116, the collaboration session 118, the security framework 122, the descriptor storage 128, the results storage 130, the cloud environment 102, or any component or subcomponent of the system 100. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 820, for example, that comprises instructions executable with the processor 816 or other processor to implement one or more of the features of the logical components. When any one of the logical components includes the portion of the memory that comprises instructions executable with the processor 816, the component may or may not include the processor 816. In some examples, each logical component may just be the portion of the memory 820 or other physical memory that comprises instructions executable with the processor 816, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, ... and <N>" or "at least one of <A>, <B>, ... <N>, or combinations thereof" or "<A>, <B>, ... and/or <N>" are defined by the Applicant in the broadest sense, superseding any other implied definitions hereinbefore or hereinafter unless expressly asserted by the Applicant to the contrary, to mean one or more elements selected from the group comprising A, B, ... and N. In other words, the phrases mean any combination of one or more of the elements A, B, ... or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects.

A first aspect relates to a method comprising: receiving an executable and an input parameter for the executable; receiving a first and a second authorization of a session descriptor, the first authorization communicated via a communications network by a first remote device and the second authorization communicated via the communications network by a second remote device, the session descriptor indicative of the executable, the input parameter, and a target recipient; verifying the session descriptor is authorized based on the first authorization and the second authorization; generating, in response to the session descriptor being authorized, a collaboration result based on the input parameter and execution of the executable the collaboration result comprising output data generated by the executable; and controlling access to the collaboration result based on the session descriptor, wherein the target recipient is permitted to access the collaboration result.

A second aspect relates to the method of aspect 1, further comprising: storing the executable and the input parameter in a data storage, the executable associated with a first account and the input parameter associated with a second account; controlling access to the executable and the input parameter wherein the executable is accessible to a first account and not to a second account and the input parameter is accessible to the second account and not to the first account; and sharing the session descriptor with the first account and the second account.

A third aspect relates to the method of any preceding aspect, wherein the executable is encrypted and the input parameter is encrypted, the method further comprising: decrypting the executable with a first encryption key included in the first authorization; and decrypting the input parameter with a second decryption key included in the second authorization.

A fourth aspect relates to the method of aspect 3, further comprising: re-encrypting the executable and the input parameter after generating the collaboration result.

A fifth aspect relates to the method of any preceding aspect, wherein first authorization comprises a first certification signed by a first device with a first private key and the second authorization comprises a second certification is signed by a second device with a second private key, wherein verifying, based on the first authorization and the second authorization, the session descriptor is authorized further comprises: determining, based on a first public key associated with the first device, first the certification was signed by the first device; and determining, based on a second public key associated with the second device, that the second certification was signed by the second device.

A sixth aspect relates to the method of aspect 5, wherein the first public key and the second public key are included in the session descriptor.

A seventh aspect relates to the method of any preceding aspect, wherein generating, in response to the session descriptor being authorized, the collaboration result further comprises: executing the executable by a task; and communicating the input parameter to the task.

An eighth aspect relates to a system comprising: a processor, the processor configured to: store a session descriptor, the session descriptor indicative of an executable, an input parameter for the executable, and a target recipient; control access to the executable and the input parameter, wherein a first account is permitted to access the executable and not the input parameter, wherein a second account is permitted to access the input parameter and not the executable; receive a first and second authorization of the session descriptor, the first authorization corresponding to the first account and the second authorization corresponding to the second account; verify the session descriptor is authorized based on the first authorization and the second authorization; generate, in response to the session descriptor being authorized, a collaboration result based on the executable and the input parameter; and control access to the collaboration result based on the session descriptor, wherein the target recipient is permitted to access the collaboration result.

A ninth aspect relates to the system of aspect 8, wherein to generate the collaboration result, the processor is further configured to: generate a task for the executable; provide the input parameter to the task; and receive the collaboration result from the task.

A tenth aspect relates to the system of any preceding aspect, wherein the processor is further configured to: store a plurality of executables associated with different accounts holders, respectively, wherein to generate the collaboration result, the processor is further configured to: generate a plurality of tasks for each of the executables; provide output data from a first one of the tasks to a second one of the tasks; and generate the collaboration result based on output data from the second one of the tasks.

An eleventh aspect relates to the system of any preceding aspect, wherein the processor is further configured to: store a plurality of input parameters associated with different accounts holders, respectively, wherein to generate the collaboration result, the processor is further configured to: generate a task for the executable; provide the input parameters to the task; and receive the collaboration result from the task.

A twelfth aspect relates to the system of any preceding aspect, wherein the processor is further configured to: transmit the collaboration result to the target recipient after the collaboration result is generated.

A thirteenth aspect relates to the system of any of preceding aspect, wherein the input parameter is encrypted based on a first encryption key and the executable is encrypted based on a second encryption key, wherein the processor is further configured to: decrypt the input parameter based on the first encryption key; and decrypt the executable based on the second encryption key.

A fourteenth aspect relates to the system of any of preceding aspect, wherein the processor is further configured to: re-encrypt the executable and the input parameter after the collaboration result is generated.

A fifteenth aspect relates to a non-transitory computer readable storage medium comprising: a plurality of instructions executable by a processor, the instructions configured to cause the processor to: receive a session descriptor, the session descriptor indicative of an executable, an input parameter for the executable, and a target recipient; control access to the executable and the input parameter, wherein a first accountholder is permitted to access the executable and not the input parameter, wherein a second accountholder is permitted to access the input parameter and not the executable; receive a first and second authorization of the session descriptor, the first authorization corresponding to the first accountholder and the second authorization corresponding to the second accountholder; determine, based on the first authorization and the second authorization, the session descriptor is authorized; generate, in response to the session descriptor being authorized, a collaboration result based on the executable and the input parameter; and control access to the collaboration result based on the session descriptor, wherein the target recipient is permitted to access the collaboration result.

A sixteenth aspect relates to the non-transitory computer readable storage medium of aspect 15, wherein the instructions further cause the processor to transmit the session descriptor with the first accountholder and the second accountholder.

A seventeenth aspect relates to the non-transitory computer readable storage medium of any preceding aspect, wherein the executable is encrypted and the input parameter is encrypted, wherein the instructions further cause the processor to: decrypt the executable with a first encryption key included in the first authorization; and decrypt the input parameter with a second decryption key included in the second authorization.

An eighteenth aspect relates to the non-transitory computer readable storage medium of any preceding aspect, wherein the executable is encrypted and the input parameter is encrypted, wherein the instructions further cause the processor to: transmit the collaboration result to the target recipient; and delete the input parameter and the executable after the collaboration result is transmitted to the target recipient.

An nineteenth aspect relates to the non-transitory computer readable storage medium of any preceding aspect, wherein the first authorization comprises a first certification digitally signed by a first private key paired with a first public key, wherein the second authorization comprises a second certification digitally signed by a second private key paired with a second public key, wherein the first public key is associated with the first accountholder and the second public key is associated with the second accountholder.

A twentieth aspect relates to the non-transitory computer readable storage medium of aspect 19, wherein to determine, based on the first authorization and the second authorization, the session descriptor is authorized, the instructions further cause the processor to: decrypt the first certification with the first public key; and decrypt the second certification with the second public key.

What is claimed is:

1. A method comprising:
   receiving, at a server, an executable and an input parameter for the executable;
   storing, by the server, the executable and the input parameter in a data storage, the executable associated with a first account and the input parameter associated with a second account;
   controlling access on the server to the executable and the input parameter, wherein the executable is accessible to the first account and not to the second account on the server and the input parameter is accessible to the second account and not to the first account on the server;
   sharing a session descriptor with the first account and the second account;
   receiving, at the server, a first and a second authorization of the session descriptor, the first authorization communicated via a communications network by a first remote device and the second authorization communicated via the communications network by a second remote device, the session descriptor indicative of the executable, the input parameter, and a target recipient;
   verifying, at the server, the session descriptor is authorized based on the first authorization and the second authorization;
   generating, in response to the session descriptor being authorized, a collaboration result at the server based on the input parameter and execution of the executable without the first account gaining access to the input parameter and without the second account gaining access to the executable, the collaboration result comprising output data generated by the executable; and
   controlling access at the server to the collaboration result based on the session descriptor, wherein the target recipient is permitted to access the collaboration result.

2. The method of claim 1, wherein the executable is encrypted and the input parameter is encrypted, the method further comprising:
   decrypting the executable with a first encryption key included in the first authorization; and
   decrypting the input parameter with a second encryption key included in the second authorization.

3. The method of claim 2, further comprising:
   re-encrypting the executable and the input parameter after generating the collaboration result.

4. The method of claim 1, wherein first authorization comprises a first certification signed by a first device with a first private key and the second authorization comprises a second certification is signed by a second device with a second private key, wherein verifying, based on the first authorization and the second authorization, the session descriptor is authorized further comprises:
   determining, based on a first public key associated with the first device, first the certification was signed by the first device; and
   determining, based on a second public key associated with the second device, that the second certification was signed by the second device.

5. The method of claim 4, wherein the first public key and the second public key are included in the session descriptor.

6. The method of claim 1, wherein generating, in response to the session descriptor being authorized, the collaboration result further comprises:
   executing the executable by a task; and
   communicating the input parameter to the task.

7. A system comprising:
   a processor, the processor configured to:
   store a session descriptor, the session descriptor indicative of an executable, an input parameter for the executable, and a target recipient;
   control access to the executable and the input parameter, wherein a first account is permitted to access the executable and not the input parameter, wherein a second account is permitted to access the input parameter and not the executable;
   receive a first and second authorization of the session descriptor, the first authorization corresponding to the first account and the second authorization corresponding to the second account;
   verify the session descriptor is authorized based on the first authorization and the second authorization;
   generate, in response to the session descriptor being authorized, a collaboration result based on the executable and the input parameter without the first account gaining access to the input parameter and without the second account gaining access to the executable; and
   control access to the collaboration result based on the session descriptor, wherein the target recipient is permitted to access the collaboration result.

8. The system of claim 7, wherein to generate the collaboration result, the processor is further configured to:
   generate a task for the executable;
   provide the input parameter to the task; and
   receive the collaboration result from the task.

9. The system of claim 7, wherein the processor is further configured to:
   store a plurality of executables associated with different accounts holders, respectively,
   wherein to generate the collaboration result, the processor is further configured to:
   generate a plurality of tasks for each of the executables;
   provide output data from a first one of the tasks to a second one of the tasks; and
   generate the collaboration result based on output data from the second one of the tasks.

10. The system of claim 7, wherein the processor is further configured to:
    store a plurality of input parameters associated with different accounts holders, respectively,
    wherein to generate the collaboration result, the processor is further configured to:
    generate a task for the executable;
    provide the input parameters to the task; and
    receive the collaboration result from the task.

11. The system of claim 7, wherein the processor is further configured to:
    transmit the collaboration result to the target recipient after the collaboration result is generated.

12. The system of claim 7, wherein the input parameter is encrypted based on a first encryption key and the executable is encrypted based on a second encryption key, wherein the processor is further configured to:
    decrypt the input parameter based on the first encryption key; and decrypt the executable based on the second encryption key.

13. The system of claim 12, wherein the processor is further configured to:
re-encrypt the executable and the input parameter after the collaboration result is generated.

14. A non-transitory computer readable storage medium comprising:
a plurality of instructions executable by a processor, the instructions configured to cause the processor to:
receive a session descriptor, the session descriptor indicative of an executable, an input parameter for the executable, and a target recipient;
control access to the executable and the input parameter, wherein a first accountholder is permitted to access the executable and not the input parameter, wherein a second accountholder is permitted to access the input parameter and not the executable;
receive a first and second authorization of the session descriptor, the first authorization corresponding to the first accountholder and the second authorization corresponding to the second accountholder;
determine, based on the first authorization and the second authorization, the session descriptor is authorized;
generate, in response to the session descriptor being authorized, a collaboration result based on the executable and the input parameter without the input parameter being accessible by the first account holder and without the executable being accessible by the second account holder; and
control access to the collaboration result based on the session descriptor, wherein the target recipient is permitted to access the collaboration result.

15. The non-transitory computer readable storage medium of claim 14, wherein the instructions further cause the processor to transmit the session descriptor with the first accountholder and the second accountholder.

16. The non-transitory computer readable storage medium of claim 14, wherein the executable is encrypted and the input parameter is encrypted, wherein the instructions further cause the processor to:
decrypt the executable with a first encryption key included in the first authorization; and
decrypt the input parameter with a second encryption key included in the second authorization.

17. The non-transitory computer readable storage medium of claim 14, wherein the executable is encrypted and the input parameter is encrypted, wherein the instructions further cause the processor to:
transmit the collaboration result to the target recipient; and
delete the input parameter and the executable after the collaboration result is transmitted to the target recipient.

18. The non-transitory computer readable storage medium of claim 14, wherein the first authorization comprises a first certification digitally signed by a first private key paired with a first public key, wherein the second authorization comprises a second certification digitally signed by a second private key paired with a second public key, wherein the first public key is associated with the first accountholder and the second public key is associated with the second accountholder.

19. The non-transitory computer readable storage medium of claim 18, wherein to determine, based on the first authorization and the second authorization, the session descriptor is authorized, the instructions further cause the processor to:
decrypt the first certification with the first public key; and
decrypt the second certification with the second public key.

* * * * *